(12) United States Patent
Kaplan

(10) Patent No.: US 6,219,140 B1
(45) Date of Patent: Apr. 17, 2001

(54) APPARATUS FOR COMPENSATION FOR SPECTRAL FLUCTUATION OF A LIGHT SOURCE AND A SCANNER INCORPORATING SAID APPARATUS

(75) Inventor: Martin C. Kaplan, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/212,991

(22) Filed: Dec. 16, 1998

(51) Int. Cl.$^7$ ........................................................ G01J 3/51
(52) U.S. Cl. .......................... 356/406; 356/419; 250/226; 250/208.1
(58) Field of Search ..................... 356/319, 405, 356/406, 407, 416, 419; 250/208.1, 226, 234

(56) References Cited

U.S. PATENT DOCUMENTS

| | | | |
|---|---|---|---|
| 4,291,975 | * 9/1981 | Raccah | ................................. 356/319 |
| 5,173,780 | 12/1992 | Mead . | |
| 5,274,228 | 12/1993 | Kaplan . | |
| 5,406,070 | 4/1995 | Edgar et al. . | |
| 5,692,094 | 11/1997 | Tsukamoto . | |

FOREIGN PATENT DOCUMENTS

| | | | |
|---|---|---|---|
| 0 081 702 | * 6/1983 | (EP) | ...................................... 356/416 |
| 0 134 273 | * 3/1985 | (EP) . | |

\* cited by examiner

Primary Examiner—F. L. Evans
(74) Attorney, Agent, or Firm—Thomas H. Close

(57) ABSTRACT

The invention discloses an apparatus for compensation for spectral fluctuation of a light source. Additionally the invention discloses a scanner incorporating the apparatus for compensation. A lamp generates light, which is sent into a light directing device. From the light directing device a sensor means and a spectral monitor means for determining the spectral content of the light from said lamp receive the light. A signal processing means receives the output from said spectral monitor means and said sensor means for producing a signal compensated for spectral fluctuations. A scanner, incorporating the inventive apparatus, additionally comprises a medium for scanning which is positioned between said sensor means and said light directing device and a lens is positioned between said medium for scanning and said sensor means, for imaging said medium onto said sensor means.

20 Claims, 3 Drawing Sheets

APPARATUS FOR COMPENSATION FOR SPECTRAL FLUCTUATION OF A LIGHT SOURCE AND A SCANNER INCORPORATING SAID APPARATUS

FIELD OF THE INVENTION

The invention relates to an apparatus for compensation for spectral fluctuation of a light source.

The invention further relates to a scanner incorporating said apparatus so that the output of the scanner can be compensated for spectral fluctuations.

BACKGROUND OF THE INVENTION

Light sources are used in a wide variety of applications. Continuous light sources produce light for an extended interval of time. Intermittent light sources produce a series of flashes. Spectral stability of the light source is an important property for many applications.

Metal halide lamps are a fairly new lamp technology that has many advantages, such as high efficiency. However, metal halide lamps have considerably less spectral stability than many other lamp technologies. This spectral instability severely impairs the usefulness of metal halide lamps in digital imaging scanners, such as photographic film input scanners.

In a digital film input scanner, the spectral transmission of the film is measured, pixel by pixel, and converted to digital data representing the image content of the film. Spectral transmission of the film is measured by illuminating the film with a light source, and measuring the light which passes through the film with a spectrally sensitive detector system. Many different types of light sources may be used, such as tungsten lamps, fluorescent lamps, xenon arc lamps, flash lamps, LEDs, lasers, and metal halide lamps. Many different types of detectors may be used, such as CCDs, photodiodes, photomultipliers, and CMOS sensor arrays. The spectral measurement of the light passing through the film may be accomplished in many ways, such as color filter arrays (CFAs) which make different sensor pixels have different spectral responses (such as red, green, and blue), alternating color filters (such as measuring first through a red filter at every pixel, then a green filter, then blue), alternating light source spectra (such as first turning on a red lamp only, then green only, then blue only) and tilted dichroic filters (such as to direct red light to one sensor array, green light to a second sensor array, blue to a third sensor array). Generally, unintended spectral instabilities in the light source, i.e. spectral noise, will be manifested as errors in the digital data produced by the scanner.

A "Method and Apparatus for Correcting Drift in the Level of a Video Signal in a Telecine" is disclosed in U.S. Pat. No. 5,173,780 granted to Mead on Dec. 22, 1992. Here, a CRT scanning means scans a film and performs an auxiliary scan through a film perforation. The auxiliary scan gives rise to a video signal which corresponds to a "no film" condition. The video signal from the auxiliary scan is fed to a comparator and then to a control unit which increments or decrements the photomultiplier output control.

A scanning method is disclosed in U.S. Pat. No. 5,406,070 to Edgar, entitled "Method and Apparatus for Scanning an Object and Correcting Image Data Using Concurrently Generated Illumination Data", granted on Apr. 11, 1995. The method includes the steps: using a first portion of a light sensor to generate image data of an object; using a second portion of a light sensor to generate illumination data of an illumination source concurrently with the generation of image data by the first portion of the light sensor; and correcting the generated image data using the concurrently generated illumination data.

An apparatus for scanning a photographic film, which has also a magnetic recording track, is disclosed in U.S. Pat. No. 5,692,094 to Tsukamoto, entitled "Film Image Scanning Apparatus for Picking up an Image and Magnetic Data Recorded on a Film Without Deterioration from Noise Generated By a Peripheral Circuit", granted Nov. 25, 1997. A light source illuminates a developed silver salt photographic film having a magnetic recording portion on which magnetic data is recorded. A light source drive section drives the light source. An image read section reads image data from the film illuminated by the light source. A reproduction section reproduces magnetic data recorded on the magnetic recording portion of the film. A power feeding control section prohibits a power feeding to the light source drive section or reduces an amount of power feeding when the magnetic data is reproduced by the reproduction section.

The above cited prior art does not tackle the problem of a light source or illumination system which is compensated for spectral fluctuations, so that devices with such illumination systems provide a more reliable output. U.S. Pat. No. 5,406,070 applies a system which allows only the control or the adjustment of intensity fluctuations of the lamp used in the light source. The film image scanning apparatus as disclosed in U.S. Pat. No. 5,692,094 is able to pick up image data and magnetic data recorded on the film. The apparatus does not provide a correction of the lamp according to spectral fluctuations. The power feeding to the lamp is reduced when magnetic data is reproduced from the magnetic layer.

According to the above there is no suggestion to provide an apparatus for the compensation of spectral fluctuations of a lamp used in a light source. It has to be assumed that the above cited prior art uses lamps or illumination systems which provide a fairly constant illumination with respect to spectral fluctuations. High output lamps and/or illumination systems with a constant spectral emission are expensive and cumbersome.

SUMMARY OF THE INVENTION

It is an object of the present invention to provide an apparatus, which compensates the spectral fluctuations of a light source, so that devices which are sensitive to the spectral stability of a lamp or an illumination system have a improved performance.

In accordance with one aspect of the present invention there is provided an apparatus for compensation for spectral fluctuation of a light source, said apparatus comprising: a lamp for generating light; a sensor means for determining the amount of light reaching said sensor means; a spectral monitor means for determining the spectral content of the light from said lamp; a light directing device receiving said light from said lamp and directing said light towards said spectral monitor means and said sensor means; and a signal processing means which receives the output from said spectral monitor means and said sensor means for producing a signal compensated for spectral fluctuations.

The advantage of the inventive apparatus is that with the compensation for spectral fluctuations, it is possible to use in principle a kind of lamp that provides the appropriate illumination for the intended use. There is no longer the need to have expensive lamps which provide a constant spectral illumination over the time of use. The inventive apparatus can compensate for spectral fluctuation.

In one preferred embodiment the apparatus for compensation for spectral fluctuation of a light source comprises: a lamp for generating light; a sensor means for determining the amount of light reaching said sensor means; a spectral monitor means having at least two sensor devices with at least two different spectral responses; an integrating cavity for directing said light from said lamp towards said spectral monitor means and said sensor means; and a signal processing means which receives the output from the spectral monitor means and the sensor means for producing a signal compensated for spectral fluctuations.

It is an additional object to provide a light source which is reduced in cost, but nevertheless can be used in a scanner with improved performance. The object is achieved by a scanner which incorporates the apparatus for compensation for spectral fluctuation of a light source. The embodiment disclosed herein shows a film scanner. The scanner comprises an apparatus for compensation for spectral fluctuation of a light source. Said apparatus has a lamp for generating light; a sensor means for determining the amount of light reaching said sensor means; a spectral monitor means for determining the spectral content of the light from said lamp; a light directing device receiving said light from said lamp and directing said light towards said spectral monitor means and said sensor means; and a signal processing means which receives the output from the spectral monitor means and the sensor means for producing a signal compensated for spectral fluctuations. The scanner additionally includes a medium for scanning and a lens is positioned in relation to said medium for scanning and said sensor means for imaging said medium onto said sensor means.

The embodiment described above shows a film scanner which means that the medium for scanning is transparent. To change the scanner from a transparent one to a reflective one does not involve any inventive skill. In case of a non-transparent medium for scanning, the lens and the sensor means have to be rearranged, so that the light reflected from the medium for scanning is imaged on the sensor means.

Further advantageous embodiments of the invention can be taken from the sub-claims.

BRIEF DESCRIPTION OF THE DRAWINGS

The subject matter of the invention is described with reference to the embodiments shown in the drawing.

DETAILED DESCRIPTION OF THE INVENTION

In a digital film input scanner, the spectral transmission of the film is measured, pixel by pixel, and converted to digital data representing the image content of the film. The spectral transmission is measured by passing light, from a light source, through the film to a spectrally sensitive pixel detector. A spectral monitor measures the spectral variations of the light source. Signals from the monitor and the pixel detector are combined by the processing unit to produce a signal which is a true indicator of the film spectral transmission, uncorrupted by spectral fluctuations of the light source.

Figure 1:
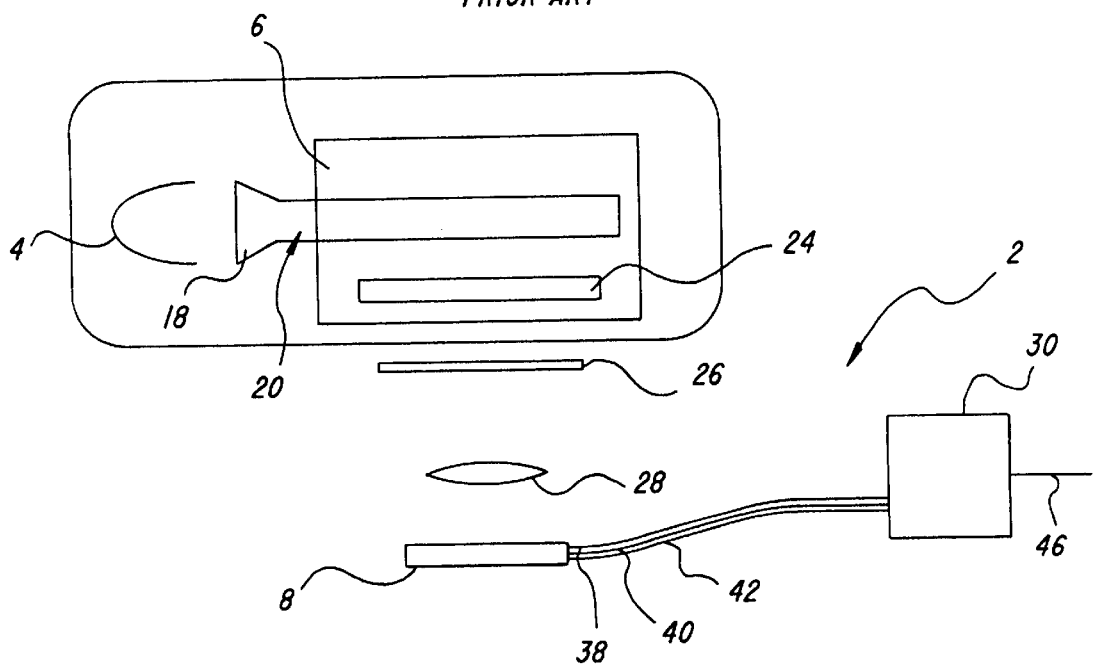
FIG. 1 is a schematic description of a prior art film scanner.

FIG. 1 shows a typical prior art film scanner 2. As described in U.S. Pat. No. 5,274,228, light from lamp 4 enters a concentrator 18, and from there the light enters a rod 20. In this prior art patent, the concentrator 18 typically has the form of a cone. The concentrator 18 collects the light from the lamp 4 and the rod 20 guides the light into a integrating cavity 6. Light from the lamp 4 exits the side of the rod 20 and diffuses throughout the interior of the integrating cavity 6. The concentrator 18 and the rod 20 increase the efficiency of the light input into the integrating cavity 6. It is clear for a skilled person that the film scanner 2 as shown in FIG. 1, would work also without the concentrator 18 and/or the rod 20. The integrating cavity 6 has a preferred cylindrical form. The rod 20 is partly inserted in the integrating cavity 6 in order the guide the light from the lamp 4 efficiently into the interior of the integrating cavity 6. The integrating cavity 6 has a window 24 formed, through which a fraction of the light exits the integrating cavity 6. The light from the integrating cavity 6 is directed onto a medium for scanning 26. In the case of a film scanner the medium for scanning 26 is a photographic film and the light from the integration cavity passes through the film and is focused by a lens 28 onto a charge coupled device (CCD) 8. In the case of a non-translucent medium for scanning 26 the light reflected from the medium for scanning 26 is focused by the lens 28 onto the CCD 8. A signal processing means 30 receives the picture signals from the CCD 8 via a first, a second, and a third input signal line 38, 40 and 42. The signal processing means 30 sends signals via an output signal line 46 to devices for further processing. The signal processing means 30 may be an electronic circuit or a computer.

Similar features in the various embodiments of the invention are marked with the same reference numeral.

The first embodiment (FIG. 2) shows a scanner 2 which has an apparatus for compensation for spectral fluctuation of a light source. The apparatus has a lamp 4. The lamp 4 may be a metal halide lamp, such as Welch Allyn Hi-Lux number L9401 (Welch Allyn, Lighting Products Division, 4619 Jordan Road, P.O. Box 187, Skaneateles Falls, N.Y. 13153-0187), but it is also possible that any other lamp can be used with this invention. The light from lamp 4 enters a light directing device 56 as described in FIG. 1. The efficiency of the light directing device 56 is increased by the use of the rod 20 and/or the concentrator 18. As described above, the light directing device 56 is an integrating cavity 6 which has a cylindrical form (for more detail see U.S. Pat. No. 5,274,228). The sensor means 60 is, for example, a charge coupled device, such as a trilinear CCD 8 incorporating a red/green/blue color filter array (Kodak KLI-2103; Eastman Kodak Company, Microelectronics Technology Division, Rochester, N.Y. 14650-2010). Another possibility for the sensor means 60 is a two-dimensional CCD (not shown). The light from the light directing device 56 reaches the sensor means 60 and a spectral monitor means 58. The spectral monitor means 58 receives a portion of light from the lamp 4 directed by the light directing device 56. The spectral monitor means 58 then determines the spectral composition of the light from the lamp 4. In the present embodiment the spectral monitor means 58 comprises a first, second and third photodiode 10, 10' and 10", such as Melles Griot 13DSI001 (Melles Griot, Photonics Components, 1770 Kettering St., Irvine, Calif. 92614). The first, second and third photodiode 10, 10' and 10" are masked with filters 12, 14 and 16, in order to obtain a differing spectral response between each photodiode. The first photodiode 10 is masked by a red filter 12, the second photodiode 10' is masked by a green filter 14, and the third photodiode 10" is masked by a blue filter 16. The red, blue and green filters 12, 14 and 16 are such as Kodak Wratten Filters No. 25 (red), No. 99 (green), and No. 98 (blue).

As described in U.S. Pat. No. 5,274,228, light from lamp 4 enters a concentrator 18, and from the concentrator enters the rod 20. Light exits the side of the rod 20 and diffuses throughout the interior of the light directing device 56 which is an integrating cavity 6 (see FIG. 1). The first second and third photodiodes 10, 10', and 10" measure the red, green, and blue content of the light. Additionally the integrating cavity 6 has a window 24 formed through which a fraction of the light exits the integrating cavity 6. In case of a scanner for a photographic film 26 the light exiting the window 24 passes through the photographic film 26, and is focused by a lens 28 onto the CCD 8. Simultaneously, signals are collected at the first, second and third photodiode 10, 10' and 10" and the CCD 8. The first, the second and the third photodiode 10, 10' and 10" are each connected via a cable 32, 34 and 36 respectively to a signal processing unit 30. Additionally, the CCD 8 is connected via three signal lines 38, 40 and 42 to a signal processing unit 30. The signals are processed in the signal processing unit 30, and are sent for further processing via an output signal line 46 to subsequent processing devices (not shown). The apparatus for compensation for spectral fluctuation of a light source is calibrated by removing the photographic film 26 (a situation referred to as "open-gate") and the signals from the photodiodes 10, 10' and 10" and the CCD 8 are collected. The calibration signals from the red, green, and blue masked photodiodes 10, 10' and 10" and the calibration signals from the red, green, and blue channels of the trilinear CCD 8, received on signal lines 38, 40 and 42 respectively, are used for the calculation of the spectral fluctuations of the lamp 4. The signal from the red masked photodiode 10 is designated $P_{r,c}$, the signal from the green masked photodiode 10' is designated $P_{g,c}$ and the signal from the blue masked photodiode 10" is designated $P_{b,c}$. The signals from the red, green and blue channels of the trilinear CCD are designated as $I_{r,c}$, $I_{g,c}$ and $I_{b,c}$ respectively. Then during normal scanning operation of the film scanner 2, the red, green, and blue film transmissions, corrected for light source fluctuations, are given by:

$$T_r = \frac{I_r}{I_{r,c}} \frac{P_{r,c}}{P_r}$$

for the red measurement of film transmission, where $I_r$ is the red signal from the CCD 8, and $P_r$ is the signal from the red masked photodiode. Similar equations are valid for the green and blue transmissions:

$$T_g = \frac{I_g}{I_{g,c}} \frac{P_{g,c}}{P_g}$$

and $$T_b = \frac{I_b}{I_{b,c}} \frac{P_{b,c}}{P_b}$$

where the variables are defined in obvious analogy to the red variables. The signal processing unit 30 receives the signals $P_r$, $P_g$ and $P_b$ from the masked photodiodes on signal lines 32, 34, and 36; and the pixel data signals from the CCD 8 $I_r$, $I_g$ and $I_b$ on the signal lines 38, 40, and 42. The processing unit 30 then applies the above equations to generate corrected pixel data transmission signals $T_r$, $T_g$ and $T_b$ which are output on signal line 46. Further signal processing, not part of this invention, may be done on the signals on line 46, such as conversion from transmission to photographic density, conversion to values appropriate to generating hard copy output (photographic prints), or any other processing.

Figure 2:
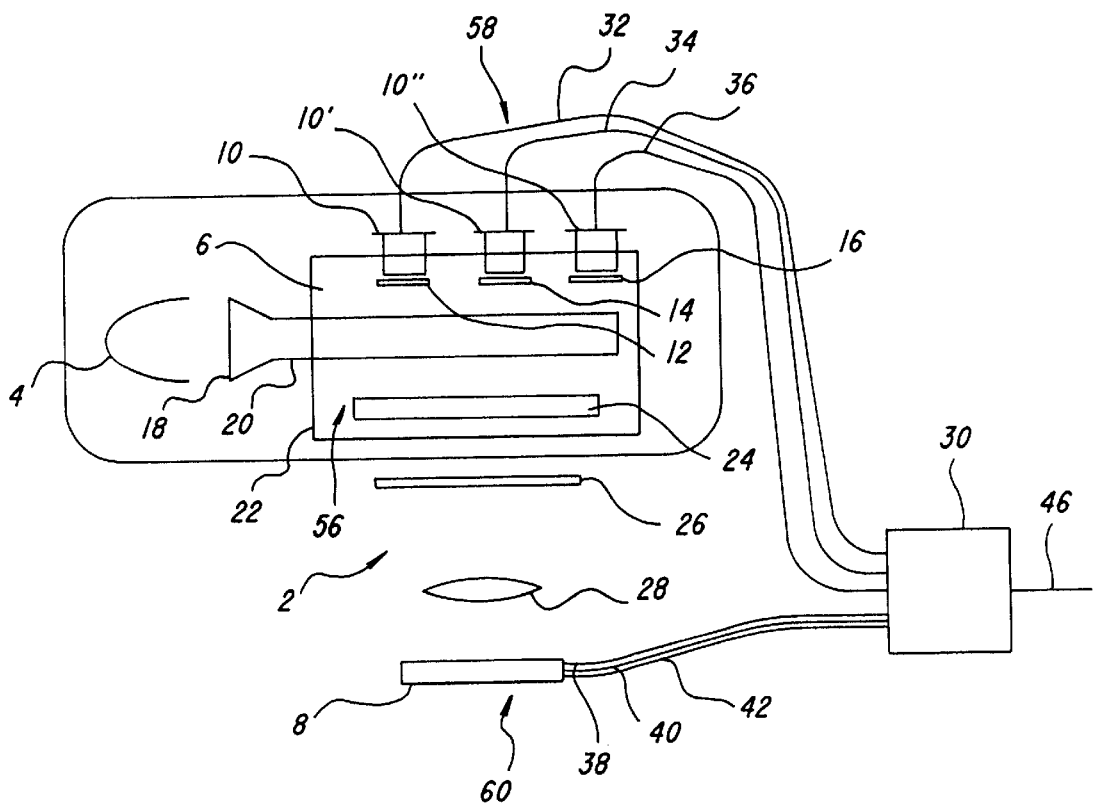
FIG. 2 is a schematic representation of a first embodiment of a digital film input scanner with red, green and blue monitors of light source variations.
Figure 3:
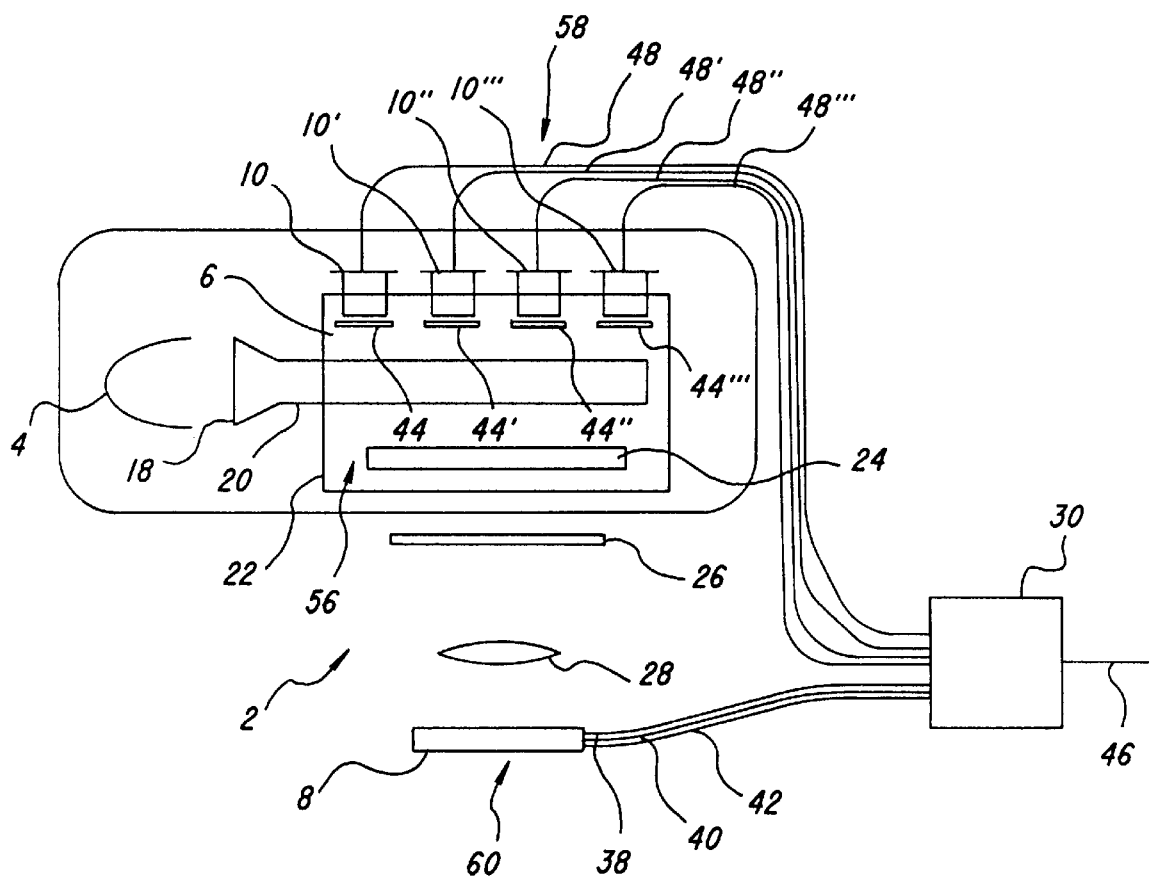
FIG. 3 is a schematic representation of a second embodiment of a digital film input scanner, having four photodiodes with respective spectral filters determined by Principal Component Analysis.

Another embodiment of the apparatus for compensation for spectral fluctuation of a light source is shown in FIG. 3. The apparatus is described as part of a film scanner 2 (see embodiment as shown in FIG. 2) which is not regarded as a limitation of the invention. The three photodiodes 10, 10' and 10" and three filters 12, 14, 16 are replaced by at least two photodiodes 10, 10', . . . , with at least two different spectral responses. The embodiment as shown in FIG. 3 has four photodiodes 10, 10', 10" and 10''' which are masked with four filters differing in the spectral transmission (here four filters 44, 44' 44" and 44''' with different spectral transmission are shown). In principal, the number of photodiodes 10, 10', . . . , and the spectral transmission of the associated filters 44, 44' 44", . . . , is determined by principal component analysis as follows.

The full spectrum of the light lamp 4 is measured over the range of wavelengths used by the scanner 2 (e.g. 400 nm to 750 nm wavelengths), using an instrument such as a Photo Research spectroradiometer (Photo Research, Inc., 9330 DeSoto Ave., Chatsworth, Calif. 91311). This spectral measurement is repeated many times, to collect data on the variations in the spectrum over time. These multiple spectral data sets are analyzed using Principal Component Analysis, which is a well know mathematical technique (see, e.g. Multivariate Statistical Methods, Donald F. Morrison, 1976, McGraw-Hill, ISBN 0-07-043186-8, chapter 8). Principal Component Analysis of the data will determine several spectral principal components, such that the measured variations in the lamp spectrum can be accurately described by a weighted combination of these principal components. The Principal Component Analysis determines how many of these principal components are needed to accurately represent the spectral variations, as well as determining the actual spectral shape of the principal components. In this embodiment, the number of photodiodes equals the number of principal components determined from principal component analysis. Each photodiode 10, 10', 10", . . . , is masked by a spectral filter 44, 44', . . . , which filter is ideally designed to have spectral transmission equal to $$\frac{\vec{P}_i}{\vec{d}}$$

where $\vec{P}$ is $i^{th}$ principal component, and $\vec{d}$ is the spectral response of the photodiode 10, 10', 10", . . . , . (The spectra are represented as vectors, with the dimensions of the vector space being the different wavelengths). This design of mask filter causes the mask/photodiode combination to have the spectral response of the principal component. (For convenience in the discussion here, the average spectrum from the lamp 4 is referred to as the $0^{th}$ principal component. The terminology varies in the mathematical literature, and often this average spectrum is not named a principal component. But this is only terminology, not a difference in mathematics.) In practice, it is generally found that all but the $0^{th}$ principal component have negative values, i.e. they specify a negative response at some wavelengths. Since the mask/photodiode combination cannot have this ideal negative response, this can be managed by defining the $i^{th}$ mask/photodiode response to consist of a weighted combination of the $i^{th}$ principal component plus the $0^{th}$ principal component, with sufficient weighting on the $0^{th}$ principal component to assure that the weighted combination has only non-negative values. Specifically, the responsivity of the $i^{th}$ mask/photodiode combination is:

$$\vec{r} = a_i \vec{P} + b_i \vec{P}_0$$

where $a_i$ and $b_i$ are constants chosen for convenience, but with $b_i$ sufficiently large to assure that $r_i$ is non-negative at all wavelengths. (Note: for the special case i=0, without loss of generality we set $b_0=0$.)

The mathematics for estimating the actual spectrum (including variation from the average spectrum) from the photodiode signals is fairly straightforward. Let $$S_i = \vec{r} \cdot \vec{I}$$

be the signals from the photodiodes, where $\vec{I}$ is the light source spectrum. First, we remove the $0^{th}$ principal component originally incorporated into each masked photodiode to avoid negative values, by calculating the effective responses $$S'_i = S_i - \frac{b_i}{a_0} S_0$$

which are the responses we would have gotten if the mask/photodiodes had the true principal component reponsivities, including negative values. Now we can reconstruct the light source spectrum by the standard Principal Component Analysis approach, namely $$\vec{I} = \sum \frac{s_i}{a_i} \vec{P}_i.$$

This estimates the actual spectrum, including variation from the average spectrum, of the noisy light source. In operation, the signals from photodiodes 10, 10', 10", . . . , are sent by signal lines 48, 48', 48", . . . , to the signal processing unit 30. The signal processing unit 30 cascades (i.e. multiplies wavelength by wavelength) the estimated lamp spectrum with the known spectral absorption of the film dyes, to determine the perturbation caused by the lamp spectral variation upon the pixel signals from signal lines 38, 40 and 42. This perturbation is then digitally subtracted from the pixel signals to determine corrected signals, i.e. what the pixel signals would have been if the light source had no spectral noise. The corrected signals are sent out signal line 46. Further digital processing, not part of this invention, may be performed by additional electronics on the signals when they arrive from signal line 46.

The attachment or the mounting of the photodiodes 10, 10', 10", . . . , to the integrating cavity 6 is carried out in the embodiments as shown in FIG. 2 and FIG. 3 in that for each photodiode, a hole (not shown) is drilled into the wall of the integrating cavity 6. The hole is completely drilled through so there is an outlet of light from the integrating cavity 6. Respective filters are positioned in the openings and each opening is then closed with a photodiode 10, 10', 10", . . . , . The material of the wall of the integrating cavity 6 can be, for example, white opaque plastic. Other mountings of the photodiodes are possible but depend on the wall material of the integrating cavity 22 and on the spectral monitor means 60 used for the measuring of the spectral composition of the lamp 4 used.

Figure 4:
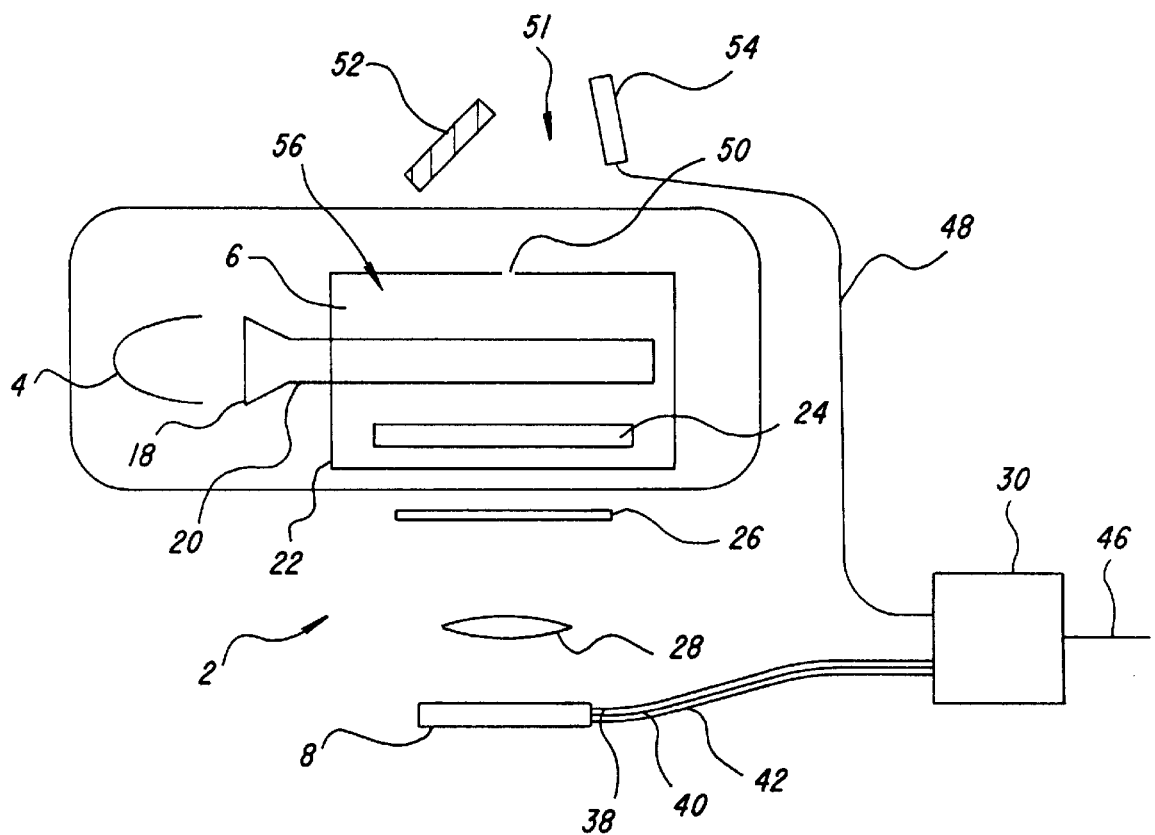
FIG. 4 is a schematic representation of a third embodiment of a digital film input scanner, having a spectroradiometer monitor.

Yet another embodiment (FIG. 4) provides a more detailed measurement of the spectrum of the lamp 4 by using a spectroradiometer 51 as the spectral monitor means. There are many well known designs for spectroradiometers 51, but the preferred choice uses a diffraction grating 52 with a linear CCD 54, which is able to simultaneously measure the spectral components at many wavelengths. In the present embodiment the photodiodes 10, 10' and 10" of FIG. 2 are replaced by the spectroradiometer 51. The spectroradiometer 51 has a dispersive element which is a diffraction grating 52 in the present embodiment. The diffraction grating 52 is positioned such that it directs the dispersed light onto and linear CCD 54. A small opening 50 is present in the wall of the integrating cavity 6 through which the light from the integrating cavity 6 (the integrating cavity may have the from of a hollow cylinder 22) can reach the diffraction grating 52 of the spectroradiometer 51. For example a light guiding fiber (not shown), mirror, and other optics can be used to guide the light from the opening 50 to the diffraction grating 52. In operation, a portion of the light inside the integrating cavity 6 passes through the narrow opening 50, and strikes diffraction grating 52. The light is diffracted by diffraction grating 52, so that different wavelengths of the light travel to different positions at CCD 54. Additional optics, such as a mirror (not shown) may be used to guide the light from the diffraction grating 52 to the CCD 54. Thus, different pixels of CCD 54 receive, and respond to, different wavelengths, effectively measuring the spectral distribution of the light coming from slit 50. This spectral distribution data is output from CCD 54, and sent via signal line 48 to the signal processing unit 30. The signal processing unit 30 now proceeds as described for example in the embodiment of FIG. 3, except that the steps required to estimate the actual spectrum are now replaced by the simple step of directly reading the actual spectrum from signal line 48.

It should be noted that in all the embodiments described, the monitoring and correcting of the spectral variations also automatically corrects for power fluctuations in the light source, without any additional effort. Many obvious variations on the preferred embodiments are possible. These include different spectroradiometer designs than shown in FIG. 4, and different numbers and spectral sensitivities of mask/photodiodes than shown in FIG. 3. Alternative detectors may be used, there being very many kinds of optical detectors; e.g. replacing the photodiodes 10, 10', 10", . . . , by photomultipliers or photoresistors; or replacing the CCDs 8 or 54 by other types of CCDs (e.g. two-dimensional arrays instead of linear arrays) or Active Pixel Sensors (CMOS devices that perform similarly to CCDs).

Figure 5:
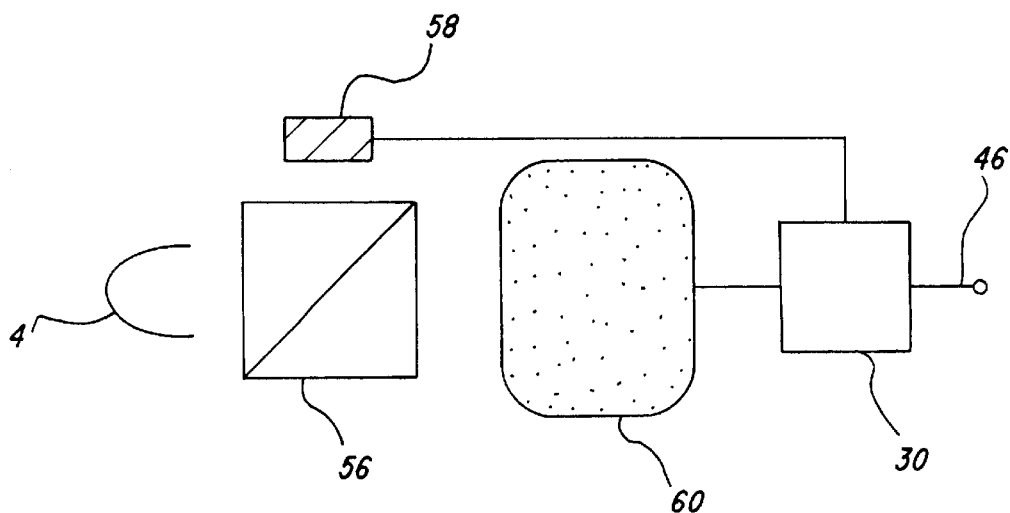
FIG. 5 is a schematic representation of a light source with a spectral monitor and a signal correction processor.

A general approach of an apparatus for compensation for spectral fluctuation of a light source is described in FIG. 5. A lamp 4 (which may be any kind of photon generating device) is positioned in relation to a light directing device 56, such that light generated by the lamp 4 enters the light directing device 56. The light directing device 56 can be for example a light integrating cavity or an optical beam splitter, which is any kind of optical device which directs a portion of the light to a spectral monitor means 58 and to a sensor means 60. The spectral monitor means 58 is any device which can measure and report spectral information about light. Data from the spectral monitor means 58 is passed to the signal processing means 30. As mentioned above the other portion of light is directed toward the sensor means 60. The sensor means 60 may be any device which absorbs light and generates output signals. These output signals are directed to the signal processing unit 30, which modifies the signals from the sensor means 60 to compensate for spectral fluctuations of the lamp 4, and outputs the corrected signals via output signal line 46 for further use.

The invention has been described in detail with particular reference to certain preferred embodiments thereof, but it will be understood that variations and modifications can be effected within the spirit and scope of the invention.

PARTS LIST 2 light source
4 lamp
6 integrating cavity
8 trilinear CCD
10 first photodiode,
10' second photodiode
10" third photodiode
12 red filter
14 green filter
16 blue filter
18 concentrator
20 rod
22 integrating cylinder
24 window
26 photographic film
28 lens
30 signal processing means
32 signal line
34 signal line
36 signal line
38 first input signal line
40 second input signal line
42 third input signal line
44, 44', . . . spectral filter
46 output signal line
48, 48', . . . signal line
50 opening
51 spectroradiometer
52 diffraction grating
54 linear CCD
56 light directing device
58 spectral monitor means
60 sensor means

What is claimed is:

1. An apparatus for compensation for spectral fluctuation of a light source comprising:
   a lamp for generating light, the light from the lamp having spectral variations;
   a sensor means for determining the amount of light reaching said sensor means;
   a spectral monitor means for determining the spectral content of the light from said lamp, the spectral monitor means comprising at least two sensor devices with at least two different spectral responses that are a weighted combination of a $0^{th}$ principal component and one additional principal component of the spectral variations in the light from the lamp;
   a light directing device receiving said light from said lamp and directing said light towards said spectral monitor means and said sensor means; and
   a signal processing means which receives the output from said spectral monitor means and said sensor means for producing a signal compensated for spectral fluctuations.

2. The apparatus for compensation for spectral fluctuation of a light source as claimed in claim 1 wherein the spectral monitor means comprises a first, second and third sensor device each with a different spectral response.

3. The apparatus for compensation for spectral fluctuation of a light source as claimed in claim 2 wherein each sensor device comprises a photodiode receiving light filtered by a spectral filter.

4. The apparatus for compensation for spectral fluctuation of a light source as claimed in claim 3 wherein the spectral filters are a red filter, a green filter and a blue filter.

5. The apparatus for compensation for spectral fluctuation of a light source as claimed in claim 1 wherein the light directing device is an integrating cavity.

6. The apparatus for compensation for spectral fluctuation of a light source as claimed in claim 5 wherein a light guiding rod is positioned to guide light from the lamp within the integrating cavity.

7. The apparatus for compensation for spectral fluctuation of a light source as claimed in claim 1 wherein the sensor means is a charge coupled device.

8. An apparatus for compensation for spectral fluctuation of a light source comprising:
   a lamp for generating light;
   a sensor means for determining the amount of light reaching said sensor means;
   a spectral monitor means, having at least two sensor devices with at least two different spectral responses, wherein each sensor device has a spectral response that is a weighted combination of a $0^{th}$ principal component and one additional principal component of the spectral variations in the light from the lamp;
   an integrating cavity for directing said light towards said spectral monitor means and said sensor means; and
   a signal processing means which receives the output from the spectral monitor means and the sensor means for producing a signal compensated for spectral fluctuations.

9. The apparatus for compensation for spectral fluctuation of a light source as claimed in claim 8 wherein a light guiding rod is positioned to guide light from the lamp within the integrating cavity.

10. The apparatus for compensation for spectral fluctuation of a light source as claimed in claim 8 wherein the sensor devices are photodiodes receiving light filtered by spectral filters.

11. The apparatus for compensation for spectral fluctuation of a light source as claimed in claim 8 wherein the sensor means is a charge coupled device.

12. The apparatus for compensation for spectral fluctuation of a light source as claimed in claim 11 wherein the charge coupled device is trilinear.

13. An apparatus for compensation for spectral fluctuation of a light source as claimed in claim 11 wherein the charge coupled device is a two-dimensional CCD.

14. A scanner comprising:
   an apparatus for compensation for spectral fluctuation of a light source having:
   a lamp for generating light;
   a sensor means for determining the amount of light reaching said sensor means;
   a spectral monitor means for determining the spectral content of the light from said lamp, the spectral monitor means including a plurality of sensor devices having different spectral responses, wherein each sensor device has a spectral response that is a weighted combination of a $0^{th}$ principal component and one additional principal component of the spectral variations in the light from the lamp;

a light directing device receiving said light from said lamp and directing said light towards said spectral monitor means and said sensor means;

a signal processing means which receives the output from the spectral monitor means and the sensor means for producing a signal compensated for spectral fluctuations;

a medium for scanning; and a lens positioned in relation to said medium for scanning and said sensor means, for imaging said medium onto said sensor means.

15. The scanner as claimed in claim 14 wherein each sensor device comprises a photodiode receiving light filtered by a spectral filter.

16. The scanner as claimed in claim 14 wherein the light directing device is an integrating cavity having the shape of a cylinder.

17. The scanner as claimed in claim 16 wherein a light guiding rod is positioned to guide light from the lamp within the integrating cavity, and a concentrator is attached to the end of the guiding rod opposing the lamp.

18. The scanner as claimed in claim 14 wherein the sensor means is a charge coupled device.

19. The scanner as claimed in claim 18 wherein the charge coupled device is trilinear.

20. The scanner as claimed in claim 18 wherein the charge coupled device is a two-dimensional CCD.

* * * * *